UNITED STATES PATENT OFFICE 2,181,424

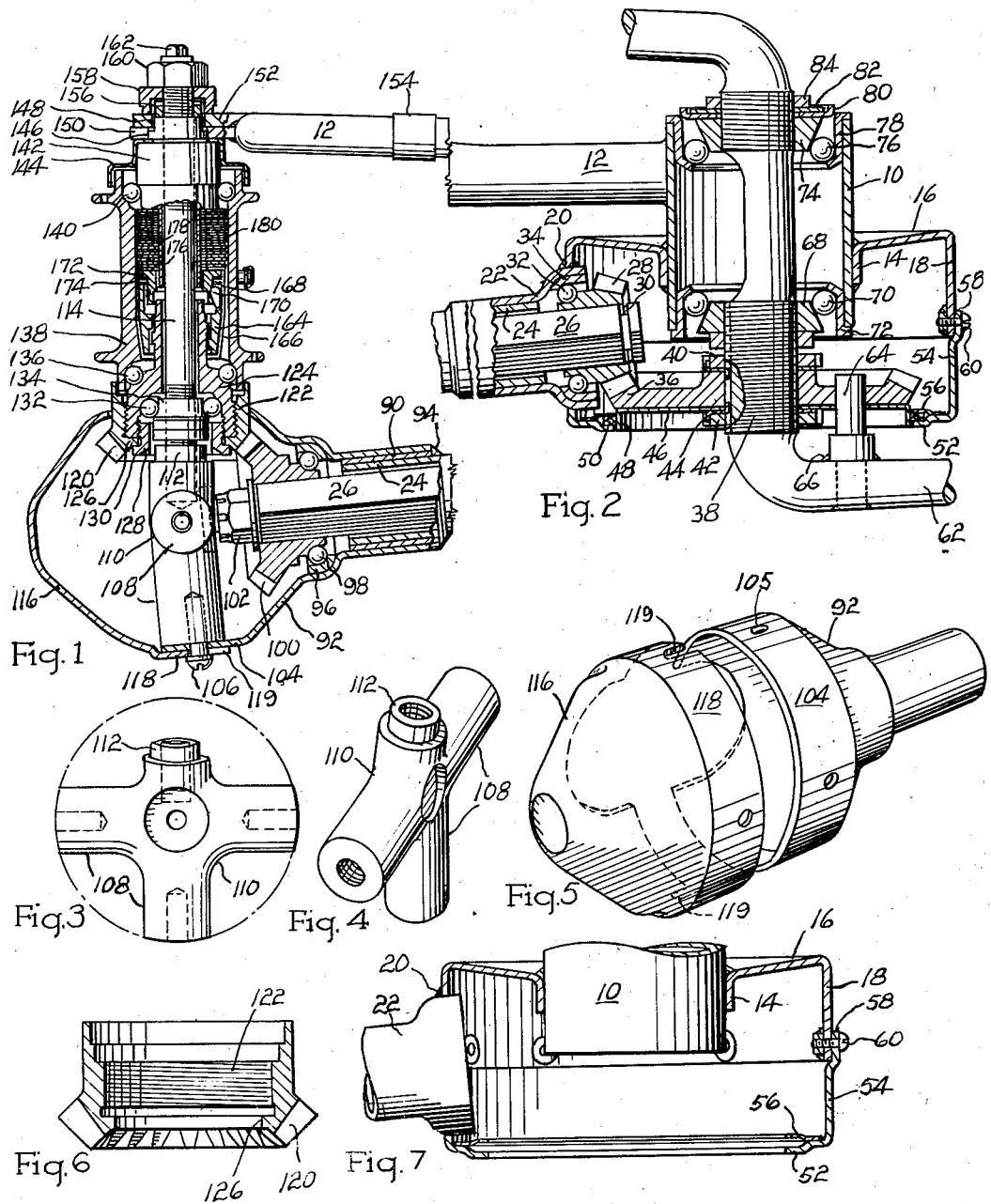

DRIVING MECHANISM FOR CYCLES

Edward W. Glacy and Thomas C. Delaval-Crow, Bristol, Conn., assignors to General Motors Corporation, Detroit, Mich., a corporation of Delaware Application October 20, 1936, Serial No. 106,617

14 Claims. (Cl. 74—400)

This invention relates to driving mechanism for cycles and comprises all of the features of novelty herein disclosed. An object of the invention is to provide improved driving mechanism, especially of the gear or chainless type. Another object is to provide improved housings and supports for driving gears and shafts, especially in a crank hanger. Another object is to provide improved means to adjust meshing gears and to render the parts accessible and easy to assemble and disassemble.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a view chiefly in horizontal section of the rear end of a bicycle.

Fig. 2 is a similar view of the crank hanger portion.

Fig. 3 is a front view of a housing support.

Fig. 4 is a perspective view of the housing support.

Fig. 5 is a perspective view of the rear gear housing.

Fig. 6 is a sectional view of a gear.

Fig. 7 is a horizontal sectional view, enlarged, of the gear housing at the crank hanger of Fig. 1.

The numeral 10 indicates a crank hanger casing which is ordinarily brazed to a pair of lower bicycle frame members one of which is shown at 12. In place of the other conventional frame member, an axial flange 14 on a gear housing 16 is brazed at each end to the casing 10 and has an outer axial flange or rim 18 which is brazed at half way around an adapter sleeve 22. The sleeve 22 is brazed to a frame tube 24 which encloses a square drive shaft 26 on which the hub of a bevel gear 28 is secured by U-shaped retainer 30 entering a groove in the shaft and projecting beyond the flats thereof. The hub of the bevel gear has a raceway groove for an angular contact ball bearing 32 whose outer race ring 34 is seated in the adapter sleeve 22.

The bevel gear 28 is driven by a large bevel gear 36 slidable on the threads of a crank shaft 38 which is threaded to receive gear adjusting nuts 40 and 42 each having a lock washer 44 with a lug entering a keyway in the shaft and a lug entering a notch in the lock nut. The nuts clamp the bevel gear 36 in position and by manipulating the nuts, the teeth of the bevel gears are adjusted into proper meshing relation. A plate or ring 46 bears flatwise against the bevel gear and has an axial flange 48 running in contact with a dust-excluding and grease-retaining felt washer 50 contained in a channel formed by a flange 52 of a cap 54 and by a cupped washer 56 brazed to the flange 52. The cap 54 has an offset rim 58 fitting over the flange or rim 18 and removably secured by screw bolts 60 to complete the gear casing. When the screw bolts 60 are removed, the cap can be withdrawn axially from the flange 48 of the ring 46 and tilted off of the crank shaft 38 to give access to the nuts 40 and 42 for gear adjustment.

The crank shaft 38 has cranks or pedal arms 62, a driving pin 64 being rivetted and brazed to one of the arms as at 66 and projecting through the ring 46 into an opening in the bevel gear 36. A bearing cone 68 for a ball bearing 70 is threaded on the shaft 38 and secured by a lock nut. An outer race ring 72 for the bearing is seated in the casing 10 where it is located endwise by a terminal flange. The crank shaft is also threaded near the other end to receive a bearing cone 74 for a ball bearing 76 having a flanged outer race ring 78. The bearing is covered by a flanged washer 80 enclosing a flat washer 82 backed up by a lock nut 84.

The rear end of the frame tube 24 extends into a filler sleeve 90 contained in a tubular projection on a gear housing 92 these three parts being brazed together as at 94. Seated in the gear housing 92 is an outer race ring 96 of an angular contact ball bearing 98 which runs in a raceway groove on the hub of a bevel gear 100 which is secured on the square drive shaft 26 by a washer and lock nut 102. The gear housing has a flange or rim 104 provided with holes 105 for headed screws 106 which enter tapped openings in the rounded ends of arms 108 on a cruciform member 110. The member 110 has a fourth arm with a tubular projection 112 which is tapped to receive the threaded end of a supporting rear axle 114. A cap 116 has a rim 118 removably secured to the gear housing by the screws 106, one screw passing through an opening in the rim and the others being received in slots 119. Thus the cap can be removed readily by loosening two screws and taking off another yet the cap cannot drop off in use.

The gear 100 drives a bevel gear 120 having a right hand thread 122 engaging a similar thread on the end of a driving sleeve 124, the gear having an internal abutment flange 126 to abut against the sleeve. A nut 128 has left hand threads engaging the sleeve and an external flange 130 overlapping the flange 126. Thus, right hand or left hand torque applied to the gear will insure a tendency to screw in either the gear or the nut 128 and lock the gear to the sleeve. The driving sleeve 124 is journalled on a ball bearing 132 having a bearing cone 134 threaded on the axle 114 and secured by lock nuts. The driving sleeve has an external ball bearing 136 to rotatably support one end of a wheel hub 138, the other end of the hub being journalled on a ball bearing 140 which is supported by an anchor block 142 fixed to the frame and the axle.

A shield 144 carried by the anchor block overlaps the end of the hub to exclude dust. The anchor block has a narrow round section 146 and beyond that a flattened end section 148. The round section is removably received in a fork 150 at the rear end of the frame tube 12. The flattened section fits in a rectangular slot at the rear end of an anchor arm 152 which is secured along the outer side of the frame tube 12 by a clip 154. The anchor block 142 is locked to the axle by a nut 156 contained in a recess of a flanged nut 158 which clamps up against the anchor arm. A lock nut 160 is screwed onto the axle which has a squared outer end section 162. To adjust the teeth of the gear 120 into proper meshing relation to the gear 100, the entire wheel hub and axle assembly is shifted endwise with respect to the gear housing 92 and the cruciform member 110. This adjustment is accomplished by backing off the nuts 158 and 160, removing the slotted anchor arm 152 from the flattened section 148 of the anchor block 142 and turning the axle 114 by means of a wrench applied to its squared outer end 162. The axle is thus screwed further into or out of the tubular projection 112 of the cruciform member. The hub assembly including the gear 120 of course shifts endwise with the axle.

A coaster brake is enclosed in the wheel hub. It preferably comprises a shiftable nut 164 having threaded engagement with the driving sleeve 124 and having a tapered clutch face to engage a corresponding clutch face 166 inside of the hub. The shiftable nut has a slotted axial flange 168 to receive a radial lug on an arcuate lag spring 170 which frictionally engages a groove in a brake actuator 172. The latter has clutch teeth 174 to engage clutch teeth on the end of the flange 168 and is splined to an anchor sleeve 176 which may be a projection of the anchor block 142. Inner brake discs 178 are also splined to the anchor sleeve and alternate with outer brake discs 180 which are splined to the hub. The operation of the mechanism for driving, braking and coasting is well understood in the art.

We claim:

1. In a device of the character described, a frame having a crank hanger casing, a crank shaft, bearings fixed axially with respect to the casing for journalling the shaft in the casing, a driving gear slidable on the shaft beyond the bearings and adapted to rotate with the shaft, a driven gear meshing with the driving gear, and means on the shaft beyond the bearings and engaging the driving gear for effecting edjustment of the driving gear with respect to the shaft, its bearings and the driven gear without disturbing the bearings; substantially as described.

2. In a device of the character described, a frame having a crank hanger casing, a crank shaft having a threaded portion, bearings for journalling the shaft in the casing, the bearings being axially fixed with respect to the casing, a driving gear, a driving gear slidable on the threads of the shaft for adjustment with respect to the shaft and the driven gear, and nuts threaded on the shaft at opposite sides of the gear to effect said adjustment without disturbing the bearings, the gear and the nuts being axially beyond and outside of the bearings; substantially as described.

3. In a device of the character described, a frame having a crank hanger casing, a crank shaft, bearings for journalling the shaft in the casing, a driven gear, a driving gear adjustable with respect to the shaft and the driven gear, nuts threaded on the shaft at opposite sides of the gear, and a driving pin connecting the gear to one of the cranks; substantially as described.

4. In a device of the character described, a frame having a crank hanger casing, a crank shaft, bearings for journalling the shaft in the casing, a driven gear, a driving gear adjustable with respect to the shaft and the driven gear, means including a nut threaded on the shaft at the inner side of the driving gear for effecting said adjustment without disturbing the bearings, and a gear housing having a removable cap enclosing the driving gear and removable to provide access to said nut; substantially as described.

5. In a device of the character described, a frame having a crank hanger casing, a crank shaft, bearings for journalling the shaft in the casing, a driven gear, a driving gear on the shaft, a gear housing secured to the crank hanger and enclosing the gears, and a ring revolving with the driving gear and having its periphery fitting within an opening of the gear housing; substantially as described.

6. In a device of the character described, a frame having a crank hanger casing, a crank shaft, bearings for journalling the shaft in the casing, a driven gear, a driving gear on the shaft, a gear housing enclosing the gears and having an opening a ring carried by the gear, and a seal between the periphery of the ring and the rim of the opening; substantially as described.

7. In a device of the character described, a frame having a crank hanger casing, a crank shaft, bearings for journalling the shaft in the casing, a driven gear, a driving gear on the shaft, a gear housing enclosing the gears and having an opening, a ring carried by the gear and having a flange within the opening, and a sealing washer on the housing and engaging the flange; substantially as described.

8. In a device of the character described, a frame having a crank hanger casing, a crank shaft, a driving gear on the shaft, a driven gear, a gear housing secured to the crank hanger casing and having a flange projecting axially therefrom, a cap surrounding the driving gear and having an axial flange, and means for securing said flanges together; substantially as described.

9. In a device of the character described, a frame having a crank hanger casing, a crank shaft, a driving gear on the shaft, a driven gear, a gear housing secured to the crank hanger casing and having a flange projecting axially therefrom, a cap having an axial flange, one of said flanges being offset to telescope with the other, and means for securing the flanges together; substantially as described.

10. In a device of the character described, a cycle frame having a crank hanger casing, bearings for journalling the shaft in the casing, a driven gear, a gear shiftable axially with respect to the shaft, means for effecting adjustment of the driving gear axially of the shaft, and a driving pin connected to one of the cranks and projecting into a hole of the driving gear to effect a driving connection in various axial positions of the driving gear on the shaft; substantially as described.

11. In a device of the character described, a cycle frame having a crank hanger casing, a crank shaft, bearings for journalling the shaft in the casing, a driven gear, a driving gear on the shaft, a gear housing secured to the hanger casing and enclosing the gears, a ring engaging the outer side of the driving gear and rotating with the gear, the periphery of the ring fitting within an opening of the gear housing, and means for effecting adjustment of the driving gear and the ring axially with respect to the shaft and the housing opening; substantially as described.

12. In a device of the character described, a cycle frame having a crank hanger casing, a crank shaft, bearings for journalling the shaft in the casing, a driven gear, a driving gear on the shaft, a gear housing secured to the hanger casing and enclosing the gears, one portion of the housing comprising a cap with an opening concentric with the shaft, a ring engaging the driving gear and rotating therewith, the periphery of the ring fitting within the cap opening, the cap being removable from the ring and the crank by axial shifting and tilting, and means accessible upon removal of said cap for effecting adjustment of the driving gear and the ring axially with respect to the shaft; substantially as described.

13. In a device of the character described, a cycle frame having a crank hanger casing, a crank shaft journalled in the casing, a driving gear on the shaft, a driven gear, a gear housing secured to the hanger casing and having a flange projecting axially therefrom, a cap surrounding the driving gear and having an opening concentric with the shaft to provide for removing it over one of the cranks, and means for securing the cap to the flange; substantially as described.

14. In a device of the character described, a cycle frame having a crank hanger casing, a crank shaft journalled in the casing, a driving gear shiftable on the shaft, means including a nut at the inner side of the driving gear for effecting axial adjustment of such gear on the shaft, a gear housing secured to the hanger casing, a cap surrounding the driving gear and secured to the gear housing, the cap being removable to provide for access to the nut at the inner side of the driving gear; substantially as described.

EDWARD W. GLACY.
THOMAS C. DELAVAL-CROW.

CERTIFICATE OF CORRECTION.

Patent No. 2,181,424.  November 28, 1939.

EDWARD W. GLACY, ET AL.

It is hereby certified that error appears in the printed specification of the above numbered patent requiring correction as follows: Page 2, first column, line 68, claim 1, for "edjustment" read adjustment; and second column, line 2, claim 2, for the word "driving" first occurrence, read driven; line 43, claim 6, after "opening" insert a comma; line 75, claim 10, before "gear" second occurrence, insert driving; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.